United States Patent
Dellow et al.

(10) Patent No.: US 8,588,406 B2
(45) Date of Patent: Nov. 19, 2013

(54) DATA OBFUSCATION

(75) Inventors: Andrew Dellow, Gloucestershire (GB); Rodrigo Cordero, Bristol (GB)

(73) Assignee: STMicroelectronics Limited, Bristol (GB)

( * ) Notice: Subject to any disclaimer, the term of this patent is extended or adjusted under 35 U.S.C. 154(b) by 1346 days.

(21) Appl. No.: 11/523,773

(22) Filed: Sep. 18, 2006

(65) Prior Publication Data
US 2007/0121943 A1    May 31, 2007

Related U.S. Application Data

(63) Continuation of application No. PCT/GB2005/001021, filed on Mar. 18, 2005.

(30) Foreign Application Priority Data

Mar. 18, 2004   (EP) ..................................... 04251573

(51) Int. Cl.
*H04K 1/00*    (2006.01)
(52) U.S. Cl.
USPC .......................................................... 380/28
(58) Field of Classification Search
USPC ....................... 380/28–30, 46, 252
See application file for complete search history.

(56) References Cited

U.S. PATENT DOCUMENTS

| | | | |
|---|---|---|---|
| 4,751,733 A | | 6/1988 | Delayaye et al. |
| 5,623,549 A | * | 4/1997 | Ritter .............................. 380/37 |
| 5,727,062 A | | 3/1998 | Ritter |
| 6,295,606 B1 | * | 9/2001 | Messerges et al. ........... 713/189 |
| 6,351,539 B1 | * | 2/2002 | Djakovic ....................... 380/268 |
| 7,092,525 B2 | * | 8/2006 | Matchett et al. ................ 380/29 |
| 7,292,693 B1 | * | 11/2007 | Mittenthal .................... 380/263 |
| 7,308,104 B1 | * | 12/2007 | Kim et al. ..................... 380/268 |
| 7,536,014 B2 | * | 5/2009 | Kim et al. ..................... 380/268 |
| 2003/0126451 A1 | | 7/2003 | Gorobets |
| 2003/0223397 A1 | * | 12/2003 | Iacono et al. ................. 370/342 |

FOREIGN PATENT DOCUMENTS

EP    0537925 A1    4/1993

* cited by examiner

*Primary Examiner* — Beemnet Dada
(74) *Attorney, Agent, or Firm* — Seed IP Law Group PLLC

(57) ABSTRACT

A portion of data is obfuscated by performing a bitwise XOR function between bits of the data portion and bits of a mask. The mask is generated based on the memory address of the data portion. A bitfield representing the memory address of the data portion is split into subset bitfields. Each subset then forms the input of a corresponding primary randomizing unit. Each primary randomizing unit is arranged to generate an output bitfield that appears to be randomly correlated with the input, but which may be determined from the input if certain secret information is known. The output of the primary randomizing units is input into a series of secondary randomizing units. Each secondary randomizing unit is arranged to input at least one bit of the output of every primary randomizing unit. The output of the secondary randomizing units are then combined by concatenation to form a data mask.

53 Claims, 6 Drawing Sheets

DATA OBFUSCATION

BACKGROUND OF THE INVENTION

1. Field of the Invention

This invention relates to preventing access to confidential data in secure systems including, but not limited to, pay-television.

2. Description of the Related Art

In secure systems, it is usually necessary that access to data of a confidential nature should be restricted. Access to data is often restricted by encrypting the data by means of a particular encryption algorithm using a secret key. Data may then be accessed by decrypting the data using a specified key that is possessed only by authorized users. In many systems, large volumes of data may need to be frequently encrypted and decrypted at a high bandwidth. In such systems, the processing requirements for performing encryption and decryption of data at the required rate may be considerable, especially if the algorithms used are complex, requiring many calculations.

We have appreciated the need for a fast and efficient means for modifying data so that unauthorized access to the data is prevented.

BRIEF SUMMARY OF THE INVENTION

In an embodiment of the invention a portion of data may be modified to prevent hackers from gaining unauthorized access to the data. In particular, a data portion is modified by combining the bits of the data portion with the bits of a mask to obscure the data. A modified data portion is generated by performing a bitwise XOR function between the bits of the data portion and the bits of a mask. To increase the security of the system, a different mask is used for each data portion. In particular, a mask used to modify a data portion is generated as a function of a predetermined attribute of the data portion, such as its memory address.

A bitfield representing the memory address of a data portion is split into a plurality of subset bitfields. Each subset then forms the input of a corresponding primary randomizing unit. Each primary randomizing unit is arranged to generate an output bitfield that appears to be randomly correlated with the input, but which may be precisely determined from the input if certain secret information is known. The randomizing unit is also arranged so that a distinct output is generated for each distinct input. In one embodiment, each randomizing unit comprises a look-up table whose contents are formed by permuting a sequence of ordered integers in a random manner. In this embodiment, the secret information corresponds to the contents of the look-up table.

The output of the primary randomizing units form the input into a series of secondary randomizing units. Each secondary randomizing unit is arranged to receive as an input at least one bit of the output of every primary randomizing unit. The secondary randomizing units are arranged to generate an output bitfield in a similar manner to the primary randomizing units.

The output of the secondary randomizing units are then combined by concatenation to form a data mask. The mask may then be used to modify the data portion, the memory address of which was used to derive the mask.

Using this method, a mask is generated from the memory address of a data portion such that a distinct mask is generated for each distinct memory address, and such that there is a quasi-random correlation between the memory address and the corresponding mask. This makes the form of a mask used to modify a data portion difficult to determine unless the secret information is known.

DETAILED DESCRIPTION OF EMBODIMENTS OF THE INVENTION

Figure 1:
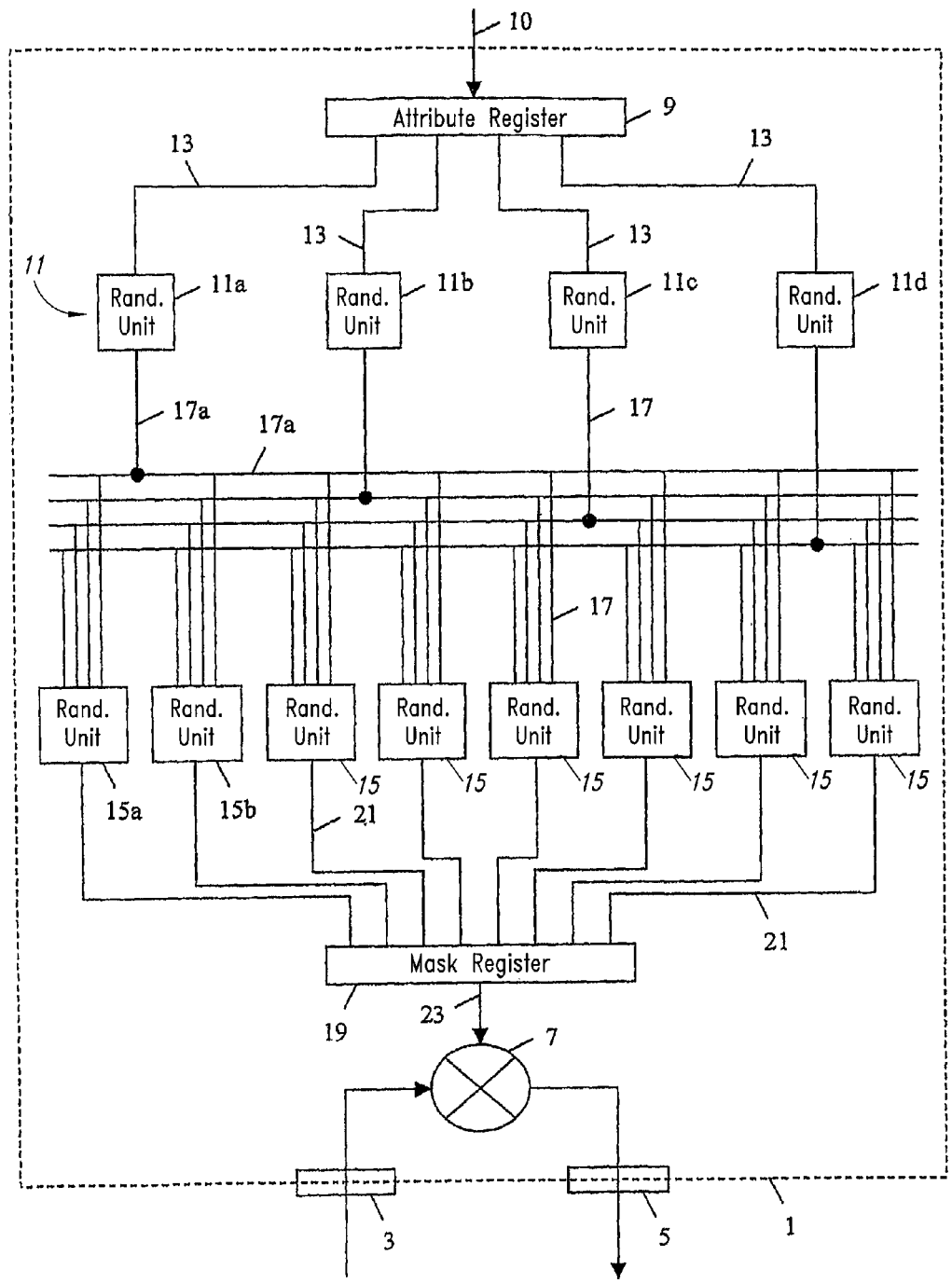
FIG. 1 is a schematic diagram of a semiconductor integrated circuit according to one embodiment of the invention.

FIG. 1 is a schematic diagram of a semiconductor integrated circuit embodying the invention. The circuit 1 comprises an input 3 which receives data to be protected from unauthorized access, and an output 5 which transmits data modified by the circuit 1. For example, the data may be privileged data transmitted from an internal data source to an external hard disc drive of a pay-television set-top box. The data received at the input 3 is received in portions of a predetermined size. For example, in the preferred embodiment, data is received in 32 bit portions. Each data portion is then modified using a data mask to produce the protected output data. The term 'obfuscation' will be used below to describe the process of modifying a data portion using a mask. A mask comprises a bitfield of a predetermined size, and a data portion may be obfuscated by combining the bits of the data portion with the bits of a mask in a predetermined manner. In the preferred embodiment for example, a mask comprises a bitfield of a size equal to that of the data portion, and the data portion may be obfuscated by performing a bitwise exclusive-or (XOR) function between the bits of the data portion and the mask. For example, in hexadecimal format, an input of data portion 'B4675E56' when XORed with a corresponding mask '2DCA2DD8' would produce the output '99AD738E'. The obfuscated data portion may be decoded by performing a bitwise XOR function between the bits of the obfuscated data portion and the mask to produce the original data portion.

In one embodiment, the bits of the data portion are permuted in a predetermined manner, either before or after the mask is applied, to further increase the security of the system. The permutation of the bits may be performed according to a permutation key or other data specifying a permutation. For example, in one embodiment, each byte of the data portion may be permuted according to a corresponding 16 bit portion of a permutation key. In this embodiment, each possible permutation of a data portion byte corresponds to a unique value of the permutation key portion. Since there are 8!=40320 possible permutations of each byte of a data portion, the corresponding permutation key portion needs to have $\log_2 40320 = 16$ bits (rounded up to the next highest integer). Permuting the bits of the data portion prevents a hacker from identifying the form of a mask by feeding known data into the system and analyzing the resulting obfuscated data.

Other ways to combine the bits of the mask with the bits of the data portion to obfuscate the data will be readily contemplated by a person skilled in the art. It is understood that a mask need not be the same size as the data portion for some methods of combination.

The process of combining a data portion with a mask is performed by a masking unit 7 having a first input, a second input, and an output. The first input and the output of the masking unit 7 are connected via data pathways respectively to the input and output of the circuit 1. The masking unit 7 receives a data portion at the first input, and receives a mask at the second input. The masking unit 7 is arranged to combine the mask and the data portion to generate and output the obfuscated data. In the preferred embodiment, the masking unit 7 is an XOR combinatorial component arranged to perform a bitwise XOR function between the data portion and the mask in the process described above.

In order to maintain a high degree of security, a different mask is used for each individual data portion. In particular, a mask for obfuscating a data portion is generated as a function of an attribute of that data portion. In the preferred embodiment for example, a mask for obfuscating a data portion is generated as a function of the memory address of that data portion. A hacker may attempt to infiltrate the system by feeding illegitimate 'test' data into the masking unit 7, and analyzing the resulting output to determine the form of a mask. If the same mask were used for every data portion, then once the form of the mask is determined, the hacker could use the mask to decode each data portion and gain unauthorized access to privileged data. The system would also be vulnerable to hacking if the form of the data masks varied in a simple manner since a hacker could then determine the pattern of changes in the masks and use this information to predict the form of subsequent masks. For this reason, it is important for maintaining security that the masks vary in a manner which is unpredictable to those not entitled to access the data. In this way, even if a hacker could determine the form of a data mask used to obfuscate a particular portion of test data, the system would still be secure because different masks would be used for subsequent real data, and a hacker could not predict the form of those masks.

Certain information used in the obfuscation process, and which may be used by authorized persons to decode the data, should remain secret otherwise the security of the system could be breached. The nature and purpose of this secret information is explained in greater detail below.

As explained above, a data mask is generated as a function of a predetermined attribute of an associated data portion. This function may be referred to as the mask function. The mask function input is thus the value of an attribute of a data portion, and the mask function output is a data mask. Two preferable properties of the mask function are these. First, there should be a low collision rate between outputs. This means that the number of distinct inputs that produce identical outputs is low. Preferably, the collision rate is minimal so that no two inputs produce identical outputs. In other words, there is preferably a one to one mapping from the possible inputs to the possible outputs. Having a minimal collision rate allows a unique mask to be generated for every data portion having a distinct value of the predetermined attribute. In the preferred embodiment for example, where the attribute is the memory address of the data portion, this would allow a unique mask to be generated for each memory address. A hacker would thus be prevented from determining the form of masks by analyzing repeating patterns in the obfuscated data when constant test data is used. It can be seen that to achieve a minimal collision rate, the number of bits in the output must be at least as large as the number of bits in the input otherwise the number of distinct inputs will be greater than the number of distinct outputs, and a one to one mapping would be impossible.

A second preferable feature of the mask function is that there is a quasi-random correlation between the inputs and the outputs. This means that an output appears to be a random function of the input. However, the output is actually a definite function of the input, so that the value of the output may be calculated for any given input, but only if certain secret information is known. It is this second property that prevents a hacker from predicting the form of subsequent masks, even if the form of some previous masks are known. A further preferable property, which follows from this second property, is that any change in the input, including a change in only an individual bit, can potentially cause a change in any of the bits of the output. For any given change in the input however, on average, only half of the bits of the output will actually change since the random correlation property means that the probability of any individual bit changing is 0.5, and this probability is independent of the change in any other bits.

Figure 2:
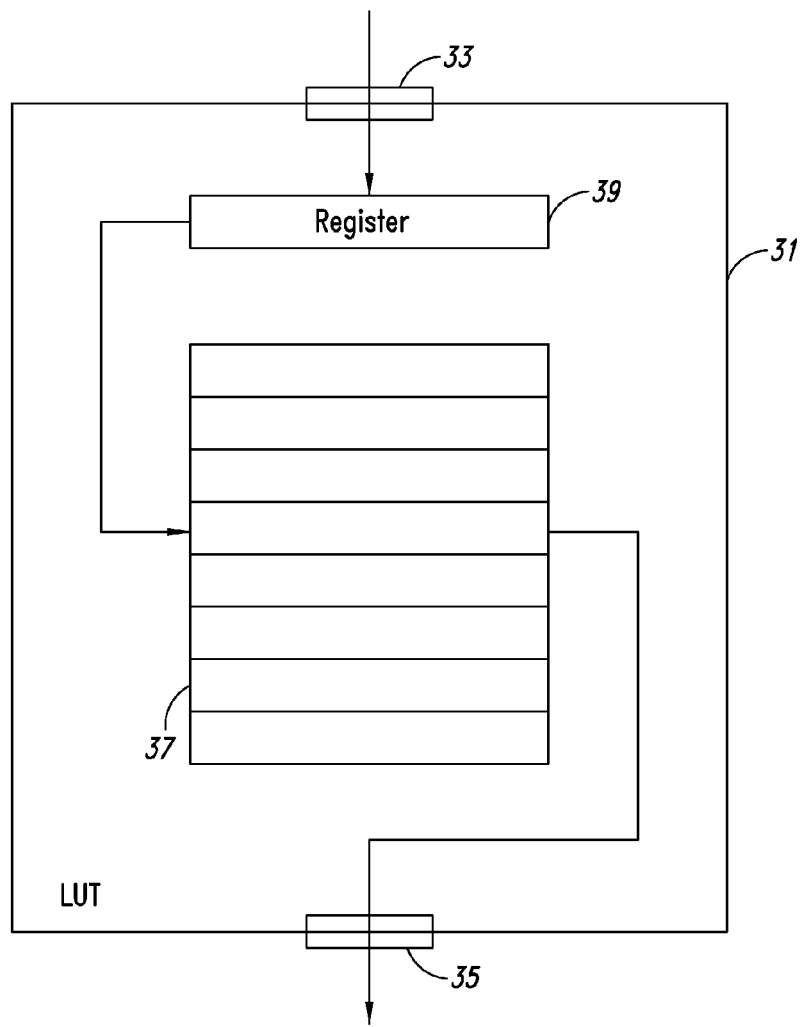
FIG. 2 is a schematic diagram of a look-up table for use in the circuit of FIG. 1.

One way to transform a bitfield by a function having the two properties described above would be to use a look-up table. One embodiment of such a look-up table is shown in FIG. 2. The look-up table 31 comprises an input 33 for receiving an input bitfield, and an output 35 for outputting a selected bitfield retrieved from the look-up table 31. The look-up table 31 is arranged to store a series of bitfields in a table 37, which are each identifiable by a unique index such as a number. The bitfield received at the input 33 is stored in a register 39, and may be regarded as a binary number which is used as an index to the table 37. The particular entry in the table 37 referred to by the contents of the register 39 is retrieved and transmitted from the output 35 of the look-up table 31.

In order to achieve a minimal collision rate using this method, there should be sufficient entries in the table 37 so that each distinct input bitfield causes a different entry in the table 37 to be selected. Also, each entry in the table 37 should be distinct. These conditions suggest that the size of the bitfields stored in the table 37 should be at least as large as the input bitfield so that there are at least as many possible distinct outputs as distinct inputs. Additionally, to prevent wasted memory, it is preferable that the table 37 is fully addressable. This means that the number of entries in the table 37 is such that every entry is capable of being selected by an input. Therefore, if the input bitfield is 'p' bits in length, for the table 37 to be fully addressable, and to allow for a minimal collision rate, the table 37 must contain exactly $2^p$ entries, each one at least p bits in length.

In one embodiment the contents of the table 37 consist of a series of random binary numbers. These may be generated by any suitable random number generator. However, using this method, there is no guarantee that a minimal collision rate will be achieved since there exists the possibility that two of the random numbers, and hence two of the entries in the table 37 will be identical. To overcome this problem, the contents of the table 37 may comprise a series of random numbers with the additional condition that each number in the series is unique. This may be achieved for example by randomly permuting a set of ordered integers, such as by repeatedly exchanging random pairs in the set. Using this method, a minimal collision rate is achieved since each bitfield in the table 37 is unique. A quasi-random correlation between inputs and outputs is achieved by virtue of the random permutation of the numbers.

When an output is generated from an input by a function having the two properties described above, the output may be referred to as being a unique, quasi-random (UQR) function of the input. Any device which generates an output bitfield as a UQR function of an input bitfield may be referred to as a UQR device. When the UQR device is a look-up table, such as the look-up table 31 shown in FIG. 2, the device may be referred to as a UQR look-up table. The mask function is preferably a UQR function, and the circuit 1 is preferably a UQR device.

A problem with the method described above is that when the size of the input and output bitfields are large, memory requirements become prohibitive. For example, if the input and output bitfields are 32 bits each, then $2^{32}$ table entries are required, each one being at least 32 bits. Therefore the total memory requirements in this case would be at least 16 gigabytes.

The circuit 1 according to one embodiment the present invention provides a means for generating an output bitfield as a function of an input bitfield with comparable speed and efficiency to the method described above, but with significantly reduced memory requirements. The circuit 1 comprises a memory such as an attribute register 9 which is arranged to store the value of the attribute of a data portion in the form of an attribute bitfield. When a data portion is to be obfuscated, the value of the attribute of that data portion is determined and stored in the attribute register 9. For example, in the preferred embodiment where the attribute is the memory address, when the data portion is retrieved from memory, the system memory bus transmits the memory address from which the data portion was retrieved to the attribute register 9 via data pathway 10. In the preferred embodiment, the attribute register 9 is arranged to store a 32 bit memory address. The attribute bitfield is then used to generate a mask for obfuscating the data portion.

The attribute bitfield is divided into a plurality of subsets, which may be referred to as attribute subsets. For example, in the preferred embodiment, the 32 bit attribute bitfield is split into four, 8 bit attribute subsets, where the first subset comprises the 8 lowest order bits of the attribute bitfield, the second subset comprises the next 8 lowest order bits, and so on. The attribute bitfield could alternatively be split into any series of attribute subsets. The bits of a subset do not have to consist of consecutive bits of the attribute bitfield, and the subsets do not have to be mutually exclusive. For example, in one embodiment, the attribute subsets are formed by permuting the attribute bitfield in a predetermined manner before splitting the permuted attribute bitfield into subsets consisting of consecutive bits.

Each attribute subset bitfield then forms the input of a corresponding one of a series of primary randomizing units 11. Various embodiments of the present invention comprise multiple copies of particular components or groups of components, and the term randomizing unit is used herein as a convenient way to refer to such a repeated component or group of components. The circuit 1 comprises a primary randomizing unit 11 for each attribute subset. For example, in the preferred embodiment, since there are four attribute subsets, there are four primary randomizing units 11. Each primary randomizing unit 11 comprises an input and an output. The attribute register 9 is connected via a series of data pathways 13 to the inputs of the primary randomizing units 11. The data pathways 13 are arranged so that each attribute subset may be extracted from the attribute register 9 and transmitted to a respective one of the primary randomizing units 11. Each primary randomizing unit 11 is arranged to output a bitfield, preferably as a UQR function of the respective input attribute subset. In other words, each primary randomizing unit 11 is preferably a UQR device.

In one embodiment, each primary randomizing unit 11 comprises a UQR look-up table. In this embodiment, when each primary randomizing unit 11, and thus each UQR look-up table receives an 8 bit attribute subset as an input, each table is arranged to store $2^8 = 256$ unique bitfields. In this embodiment, each bitfield is 8 bits in length, so that each distinct 8 bit attribute subset causes one of 256 unique 8 bit bitfields to be selected and output. Although for a UQR look-up table the bitfields in one particular look-up table are distinct from the other bitfields in the same look-up table, it is not necessary that the bitfields in one particular look-up table are distinct from the bitfields in look-up tables of other randomizing units.

Figure 3:
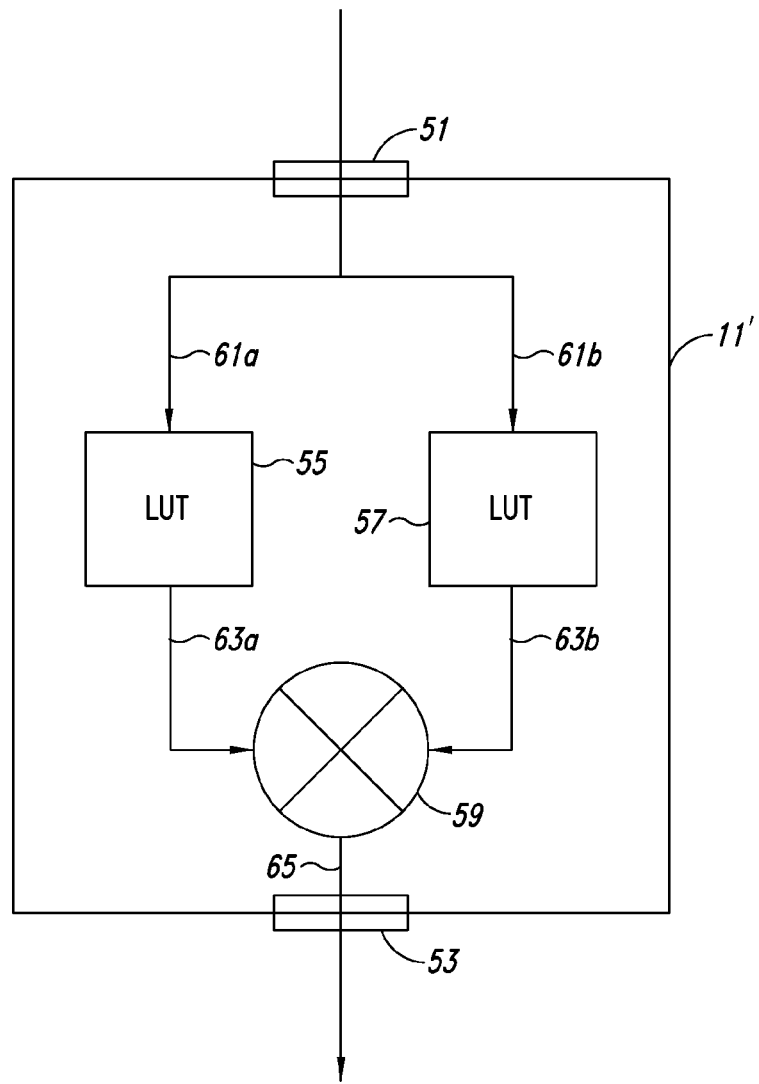
FIG. 3 is a schematic diagram of one embodiment of a randomizing unit for use in the circuit of FIG. 1.

A second embodiment of a randomizing unit 11' is shown in FIG. 3. In this embodiment, each randomizing unit 11' comprises a first look-up table 55, a second look-up table 57, and a combination unit 59. The input 51 of the randomizing unit 11' is connected via data pathways 61a, 61b to the inputs of each of the first and second look-up tables 55, 57. The outputs of the first and second look-up tables 55, 57 are connected via data pathways 63a, 63b respectively to first and second inputs of the combination unit 59. The output of the combination unit 59 is connected via a data pathway 65 to the output 53 of the randomizing unit 11'. In this embodiment, the attribute subset that is input into the randomizing unit 11' is further sub-divided into two parts of equal size. For example, in one embodiment where each attribute subset is 8 bits, the first part comprises the four lowest order bits of the attribute subset, and the second part comprises the four highest order bits of the attribute subset. The first part is transmitted along data pathway 61a to form the input of the first look-up table 55, and the second part is transmitted along data pathway 61b to form the input of the second look-up table 57. It is understood that the two parts of each attribute subset could be extracted and transmitted directly from the attribute register to the randomizing units via separate data pathways.

Each look-up table 55, 57 is arranged to store a series of bitfields that are each at least as large as the attribute subset input into the primary randomizing unit 11'. In particular, each look-up table 55, 57 is arranged to store $2^{1/2p}$ entries, each one being at least p bits, where p is the number of bits in the input of the randomizing unit 11'. Each look-up table 55, 57 is further arranged to use the part of the attribute subset that is input into the look-up table 55, 57 as an index to select and retrieve one of the series of bitfields. The output from each of the two look-up tables 55, 57 are then transmitted along data pathways 63a, 63b to the two inputs of the combination unit 59. The combination unit 59 is arranged to combine the two input bitfields in a predetermined manner to generate a new bitfield that is transmitted from the output of the combination unit 59. In particular, the combination unit 59 comprises an XOR combinatorial component which is arranged to performs a bitwise XOR function between the two input bitfields. The output of the combination unit 59 is then transmitted along data pathway 65 and forms the output of the primary randomizing unit 11'.

In one embodiment, the contents of each look-up table 55, 57 may be generated by a random number generator. However, using this method, there is no guarantee that every distinct input of the primary randomizing unit 11' will generate a unique output. In particular, there is no guarantee that no two entries in a the look-up tables 55, 57 will be the same. Also, there is no guarantee that a pair of bitfields, formed by selecting a bitfield from each look-up table 55, 57, when XORed together will not produce the same result as that for a different pair of bitfields selected in a similar way.

Preferably, the contents of the look-up tables 55, 57 are chosen so that the output of the primary randomizing unit 11' is guaranteed to be a unique, quasi-random function of the input. One way to achieve this is as follows. A first set of bitfields is chosen such that each bitfield in the set is unique. A second set of bitfields is also chosen such that each bitfield in the set is unique. However, an additional condition imposed on the second set is that no two possible pairs of bitfields, a pair being formed by selecting one bitfield from each of the two sets, when the pair are XORed together, produce identical outputs. In other words, two sets of bitfields, $\{A_n\}$, $\{B_n\}$ are chosen such that $A_i \neq A_j$ and $B_i \neq B_j$ for $i \neq j$, and $A_i$ XOR $B_j$ is unique for all combinations of i and j, with i, j=1, 2, . . . , n. With these conditions, since no two unique pairs of bitfields, $A_i$, $B_j$, when XORed together produce identical outputs, a unique output is thus generated for each unique input. Additionally, one or both of the sets of bitfields are randomly permuted so that the output is a quasi-random function of the input. The first set of bitfields forms the contents of the first look-up table 55, and the second set of bitfields forms the contents of the second look-up table 57. A set of bitfields containing n bitfields, each one having m bits may be referred to as a n×m bitfield set. A pair of n×m bitfield sets having the above properties may be referred to as a n×m bitfield set pair (BSP).

Imposing the above conditions significantly restricts the possible contents of the look-up tables 55, 57. However, n×m BSPs do exist for certain values of n and m. For example, given the 4×4 bitfield set, {0001, 0100, 1010, 1110}, there are 16 possible distinct 4×4 bitfield sets which form a 4×4 BSP. One example is {0110, 0111, 1110, 1111}. A first bitfield set is considered distinct from a second bitfield set if the first bitfield set contains at least one bitfield that is distinct from all of the bitfields in the second bitfield set. A 4×4 BSP would be appropriate for a randomizing unit 11' having an input and output of four bits. One example of a 8×6 BSP, suitable for a randomizing unit having an input and output of six bits, is {000001, 000011, 001010, 001110, 010000, 011100, 101101, 110011} with {000100, 000101, 010000, 010001, 101110, 101111, 111010, 111011}. If a n×m BSP cannot be found for particular values of n and m, the contents of the look-up table may be chosen to minimize the collision rate between the outputs of the randomizing unit.

Figure 4:
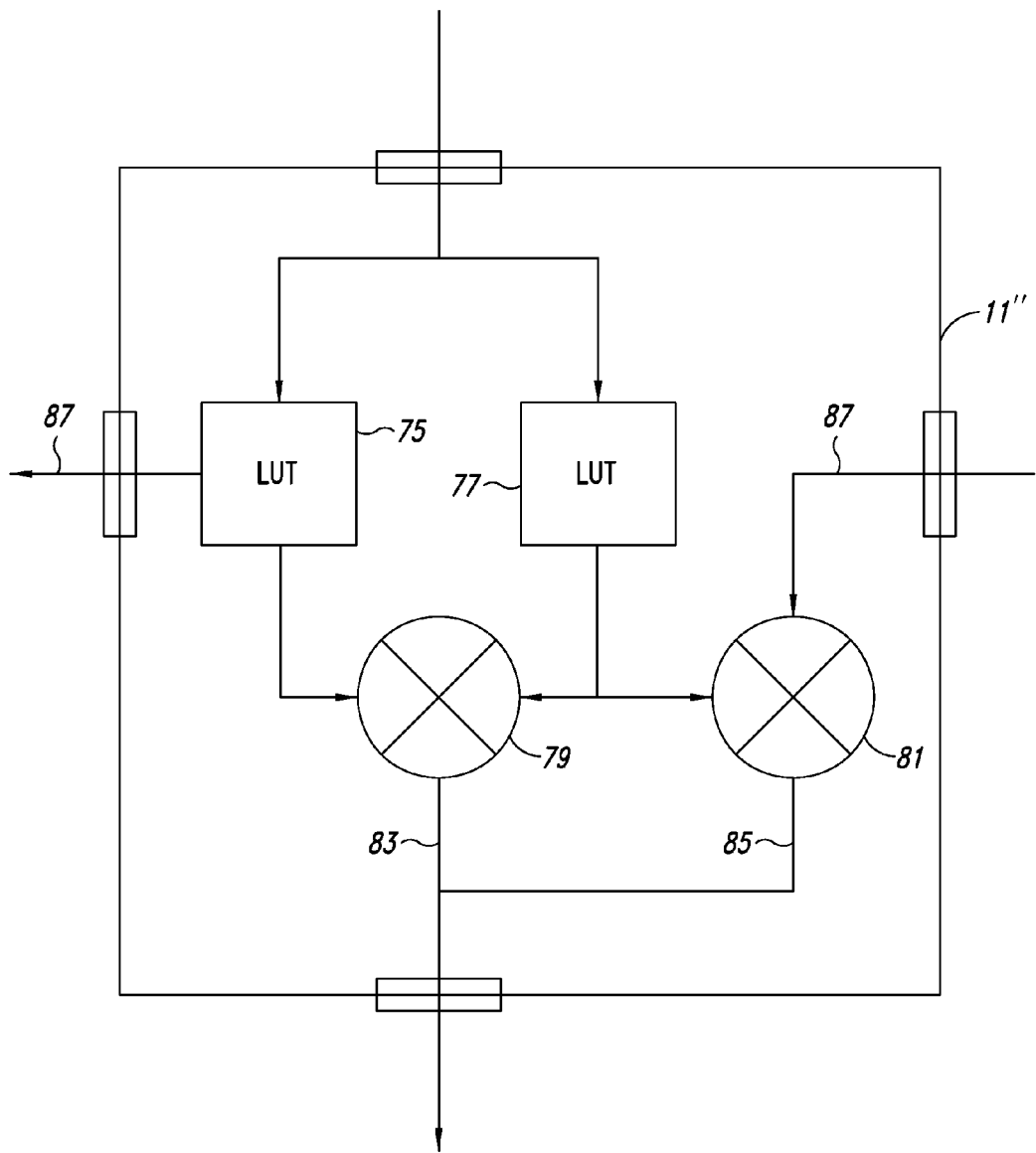
FIG. 4 is a schematic diagram of a further embodiment of a randomizing unit for use in the circuit of FIG. 1.

A third embodiment of a randomizing unit 11" is shown in FIG. 4. In this embodiment, the randomizing unit comprises first and second look-up tables 75, 77 and first and second combination units 79, 81. In a similar manner to the embodiment shown in FIG. 3, the attribute subset input into the randomizing unit 11" is sub-divided into two parts of equal size. The two parts then form the inputs of the first and second look-up tables 75, 77 which use the parts to select and retrieve one of a plurality of bitfields stored in the look-up tables 75, 77. The contents of the first and second look-up tables 75, 77 may be chosen in a similar way to the contents of the first and second look-up tables 55, 57 of the embodiment shown in FIG. 3. The bitfields retrieved from the first and second look-up tables 75, 77 are then combined by the first combination unit 79, in a similar manner performed by the combination unit 59 in the embodiment of FIG. 3, to form a first output bitfield transmitted along data pathway 83.

In addition to this, the output of the second look-up table 77 is also combined with the output of the first look-up table 75 of another randomizing unit 11" by the second combination unit 81 to form a second output bitfield transmitted along data pathway 85. In order to achieve this, a data pathway 87 connects the first look-up table 75 of each randomizing unit with the second combination unit 81 of another randomizing unit 11". For example, each randomizing unit 11" may be connected to the randomizing unit 11 that is shown in FIG. 1 as adjacent to it in the row of randomizing units. In this case, the first look-up table 75 of the randomizing unit 11a shown at the end of the row of randomizing units is connected to the second combination unit 81 of the randomizing unit 11d shown at the opposite end of the row. The first and second output bitfields are then combined, for example by concatenation, to form the output of the randomizing unit 11". It can be seen that with this embodiment, coupling between the randomizing units is provided.

In the embodiment of the randomizing unit 11" shown in FIG. 4, since the output of each look-up table 75, 77 is combined with the outputs of two different look-up tables, the output of each randomizing unit 11" in this embodiment is twice as large as the input. A randomizing unit 11" may cause an increase in the total number of bits while maintaining a minimal collision rate. However, a randomizing unit 11" cannot cause a decrease in the total number of bits while maintaining a minimal collision rate since in this case, the number of distinct outputs would be less than the number of distinct inputs. The total number of bits at any stage of the process of generating a mask can only remain the same or increase if a minimal collision rate is desired. Since the embodiment shown in FIG. 4 causes an increase in the total number of bits, when this embodiment is used in the circuit of FIG. 1, then the resulting mask will be larger than the attribute bitfield if a minimal collision rate is to be achieved.

Figure 5:
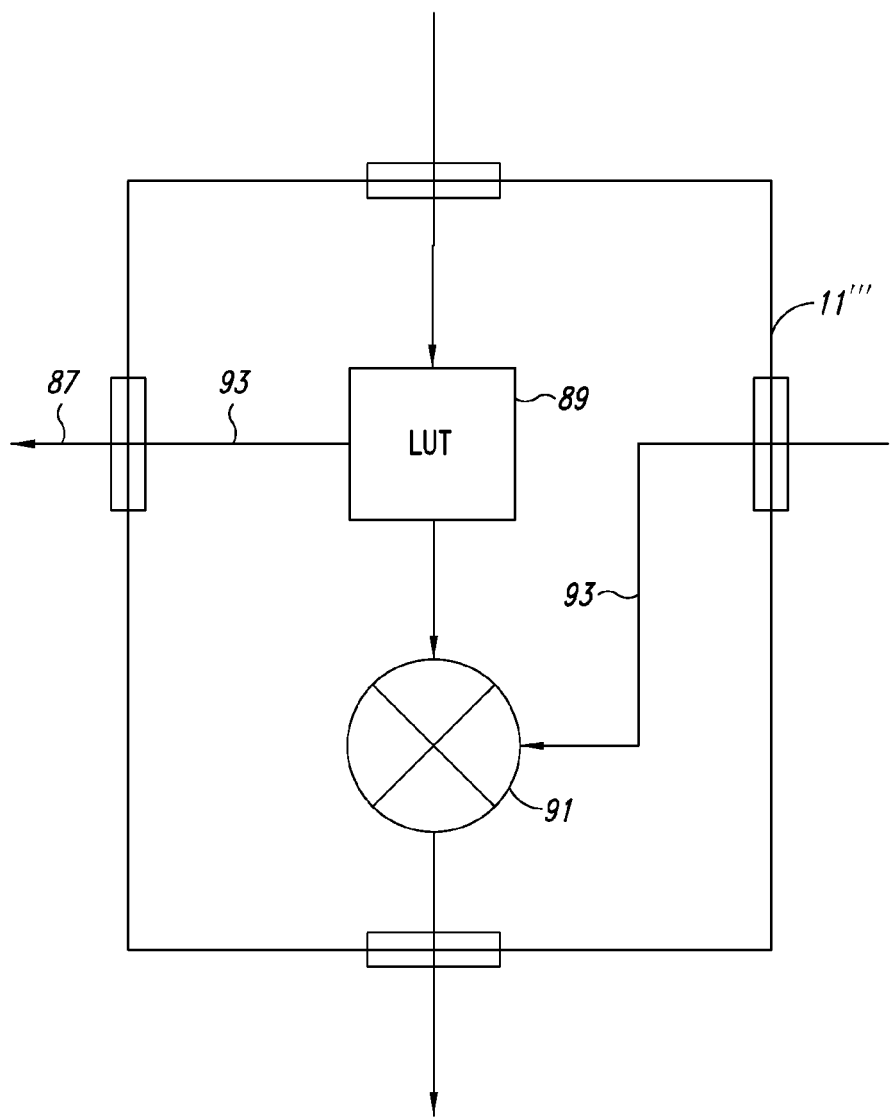
FIG. 5 is a schematic diagram of a further embodiment of a randomizing unit for use in the circuit of FIG. 1.

A fourth embodiment of a randomizing unit 11''' is shown in FIG. 5. In this embodiment, the randomizing unit 11''' comprises a look-up table 89 and a combination unit 91. The input of the randomizing unit 11''' forms the input of the look-up table 89 which uses the input as an index to select and retrieve one of a series of bitfields stored in the look-up table 89. The bitfield retrieved from the look-up table 89 then forms a first input of the combination unit 91. The combination unit 91 also receives a second input, via data pathway 93, comprising at least part of the output of another randomizing unit. For example, the output from the other randomizing unit may be the output of a look-up table of another randomizing unit. The other randomizing unit may be any one of the primary randomizing units 11 or secondary randomizing units 15 described below. The combination unit 91 is arranged to combine the two input bitfields in a similar way as the embodiments described above to generate a bitfield that forms the output of the randomizing unit 11'''.

With this embodiment, the randomizing units 11''' may be coupled in any desired way so that the output of any one randomizing unit 11''' is affected not only by the input of that particular randomizing unit 11''', but also by the input of any other randomizing unit 11'''. It can be seen that the embodiment shown in FIG. 4 may be formed from two of the embodiments of the randomizing unit shown in FIG. 5. The two inputs and outputs of the embodiments shown in FIG. 5 would together be equivalent to the input and output of the embodiment shown in FIG. 4. However, the embodiment shown in FIG. 5 allows for more arbitrary pairing of randomizing units 11''', including pairing between primary and secondary randomizing units 11, 15.

Although each of the primary randomizing units 11 may be identical, the series of primary randomizing units 11 may be comprised of two or more different embodiments.

The combined outputs of each of the primary randomizing units 11 may be considered as forming a new bitfield, which may be referred to as the secondary bitfield. The secondary bitfield comprises several subsets, which may be referred to as the secondary subsets, each one comprising the output of one of the primary randomizing units 11. It can be seen that the number of secondary subsets is equal to the number of attribute subsets, and the number of bits in each secondary subset is at least as many as the number of bits in each attribute subset. In the preferred embodiment, where each primary randomizing unit 11 receives an attribute subset of 8 bits as an input, each secondary subset (comprising the output of a particular randomizing unit) is also 8 bits. Since any change in the attribute bitfield causes a change in input of at least one of the primary randomizing units 11, and a change in input of a primary randomizing unit 11 that is a UQR device causes a change in the output, it can be seen that a change in the attribute bitfield is guaranteed to cause a change in the secondary bitfield. In other words, every distinct attribute bitfield results in a distinct secondary bitfield, and so a minimal collision rate is achieved between the attribute bitfield and the secondary bitfield. The transformation from the attribute bitfield to the secondary bitfield thus satisfies the first desired property of the mask function. However, it can be seen that when changes occur in only some of the attribute subsets, only the corresponding secondary subsets can possibly be affected. Thus, the property that any change in the input may potentially cause a change in any of the bits of the output is absent.

In order to provide a mask function having the second desired property described above, the circuit 1 further comprises a series of secondary randomizing units 15. Any of the embodiments of a primary randomizing unit 11, 11', 11", 11''', including those described above, may be used as the secondary randomizing units 15. However, each secondary randomizing unit 15 is preferably a UQR device. For example, the preferred embodiment comprises eight secondary randomizing units 15 each comprising a UQR look-up table.

At least one of the secondary randomizing units 15 receives an input that is derived from the output of at least two of the primary randomizing units 11. For example, the input of one or more secondary randomizing 15 units may comprise bits output from at least two primary randomizing units 11 and transmitted directly to the secondary randomizing units 15. The input of one or more secondary randomizing units 15 may also comprise bits that are formed by combining bits output from two or more primary randomizing units 11. Some of the bits input into the secondary randomizing units 15 may be transmitted directly from the primary randomizing units 11, and the other bits may be formed by combining the outputs of the primary randomizing units 11.

In one embodiment, the secondary randomizing units 15 receive an input comprising selected bits from the secondary bitfield. In particular, the secondary randomizing units 15 receive an input comprising at least one bit from at least two secondary subsets. In the preferred embodiment, each secondary randomizing unit 15 receives an input comprising at least one bit from the output of every secondary subset, as shown in FIG. 1. In this embodiment, the first secondary randomizing unit 15a receives an input comprising the lowest order bit from each of the secondary subsets, the second secondary randomizing unit 15b receives an input comprising the second lowest order bit from each secondary subset, and so on. The selected bits are transmitted from the outputs of the primary randomizing units 11 to the inputs of the secondary randomizing units 15 via a series of data pathways 17. For example a first series of data pathways 17a connects the output of the first primary randomizing unit 11a to the inputs of each of the secondary randomizing units 15 so that the bits of the corresponding secondary subset may be distributed to each secondary randomizing unit 15 in the manner described above. A similar series of data pathways 17 are arranged for each of the other primary randomizing units 11b-11d.

Each secondary randomizing unit 15 receives an input consisting of selected bits from the secondary bitfield and is arranged to generate an output bitfield that is preferably a UQR function of the input. Although each of the secondary randomizing units 15 may be identical, the series of secondary randomizing units 15 may be comprised of two or more different embodiments. The output from each secondary randomizing unit 15 may be referred to as a mask subset. The mask subsets are combined together in a predetermined manner to form a mask which is then stored in a memory such as mask register 19. For example, in one embodiment, the mask is formed by concatenating the mask subsets. In another embodiment, the level of security of the system may be increased by permuted the mask in a predetermined manner. The secondary randomizing units 15 are connected to the mask register 19 via a series of data pathways 21 so that a mask subset may be transmitted from each secondary randomizing unit 15 to the mask register 19. The mask stored in the mask register 19 is then transmitted via a data pathway 23 to the second input of the masking unit 7 which uses the mask to obfuscate a portion of data in the process described above.

It is essential for maintaining the security of the system that the contents of the look-up tables in the randomizing units 11, 15 remain confidential. This information, corresponding to the secret information mentioned above, allows a mask to be generated, and thus allows data to be obfuscated and subsequently decoded. It is therefore essential that the information does not become known to a hacker. The combined contents of the randomizing units 11, 15 may be regarded as a key. In this case, a data mask may then be regarded as an encrypted version of the corresponding memory address, where the encryption has been performed according to the key comprising the contents of the randomizing units 11, 15.

In one embodiment, the contents of the randomizing units 11, 15 may be periodically changed so that even if the secret information does become known, it would only be useful for a limited period of time. For example, the look-up tables comprised in the randomizing units 11, 15 may be in the form of random access memory devices whose content may be modified by appropriate signals.

To further increase the security of the system, the circuit 1 is a monolithic device such as a monolithic semiconductor integrated circuit on which all of the components of the system are contained. This prevents hackers from illegitimately replacing components, from intercepting data flow within the system, and from accessing the information content of the randomizing units 11, 15.

In the process described above, it can be seen that any change in the attribute bitfield will cause a change in input of at least one of the primary randomizing units 11. Consequently, if each primary randomizing unit 11 is a UQR device, then there will definitely be a change in the output of at least one of the primary randomizing units 11. Since the output of the primary randomizing units 11 form the input of the secondary randomizing units 15, there will definitely be a change in input of at least one of the secondary randomizing units 15. Consequently, if each secondary randomizing unit is a UQR device, then there will definitely be a change in the output of at least one of the secondary randomizing units 15. Since the output of the secondary randomizing units 15 form the mask, there will definitely be a change in at least some of the bits of the data mask. It can be seen therefore that, if the primary and secondary randomizing units 11, 15 are all UQR devices, there is a one to one mapping from the possible attribute bitfields to the possible data masks. Furthermore, in the case that each secondary randomizing unit 15 receives at least one bit from the output of every primary randomizing unit 11, it can be seen that a change in any individual bit of the attribute bitfield can potentially cause a change in the output of every secondary randomizing unit 15, and hence can potentially cause a change in any bit of the data mask.

If a data mask were generated as a unique, quasi-random function of the corresponding attribute bitfield, then any change in the attribute bitfield should be expected to cause a change in half of the bits of the data mask on average (averaging over all possible changes in the attribute bitfield). With the embodiment of the invention shown in FIG. 1, if none of the bits of a particular attribute subset change, then there will be no change in the input, and hence the output, of the corresponding primary randomizing unit 11. Therefore, if a change in the attribute bitfield does not cause a change in a certain number of attribute subsets, denoted by 'n', then there will definitely be no change in 'n' of the total bits of the input of each secondary randomizing unit 15. In other words, the probability that there will be no change in any of these particular n bits is equal to one. On the other hand, if a change in the attribute bitfield does cause a change in at least one bit of a certain number of attribute subsets, denoted by 'm', then there may be a change in 'm' of the total bits of the input of each secondary randomizing unit 15. However, if the primary randomizing units 11 are UQR devices, the probability that any individual one of these particular m bits will not actually change is 0.5. The probability that there will be a change in at least one bit of the input (of n+m bits) of each secondary randomizing unit 15, and hence a change in the corresponding mask subset is equal to one minus the probability of no bits changing, or $1-(1^n \times \frac{1}{2}^m)$.

If a change in input occurs for any secondary randomizing unit 15, on average, there will be a change in half of the bits of the corresponding mask subset (averaging over all possible contents of the look-up tables). Therefore, it can be seen that, on average, the number of bits of a data mask that change when a change occurs to the attribute bitfield is equal to $\frac{1}{2}-\frac{1}{2}^{m+1}$, where m is the number of attribute subsets in which at least one bit has changed. For example, if only a single bit of the attribute bitfield changes, there can be a change in only one attribute subset, and on average, a quarter of the bits of the corresponding data mask will change. If, however, a change in the attribute bitfield causes a change in a large number of attribute subsets, then m will be large and the term $\frac{1}{2}^{m+1}$ will be small. Therefore, on average, almost half of the bits of the corresponding data mask will change. It can be seen that the method and apparatus of the present invention most closely provides a true UQR function when a change in the attribute bitfield affects many of the attribute subsets. It can also be seen that if the attribute bitfield is split into a greater number of attribute subsets, then a random change in the attribute bitfield will cause a change in a greater number of attribute subsets on average. In this case, the value of m would be larger on average, and the method and apparatus described above would more closely resemble a UQR function.

In order to provide a method and apparatus that more closely resembles a UQR function when only a small number of attribute subsets are affected by a change in the attribute bitfield, a two stage process may be carried out. First, a mask is generated as a function of a predetermined attribute in the method described above. Then, the resulting mask is input into the attribute register and a further mask is generated as a function of the original mask. The second mask may then be used by the masking unit 7 to obfuscate a data portion. In this process, it can be shown that, with the embodiment of FIG. 1, for a given change in the original attribute bitfield, the probability of any individual mask subset (of the final mask) changing is $1-(\frac{1}{2}+\frac{1}{2}^{2m+1})^s$, where s is the number of attribute subsets, and m is the number of these in which a change in at least one bit has occurred. For example, if a change occurs in only one bit of the attribute bitfield, then m=1, and if s=4, then the above probability is 0.85. The equivalent probability for a one stage process is 0.5.

Although it is preferable that a mask is generated as a UQR function of the attribute bitfield, embodiments in which this is not the case fall within the scope of the present invention. A collision rate that, although not minimal, is sufficiently low may still be acceptable for many applications.

Figure 6:
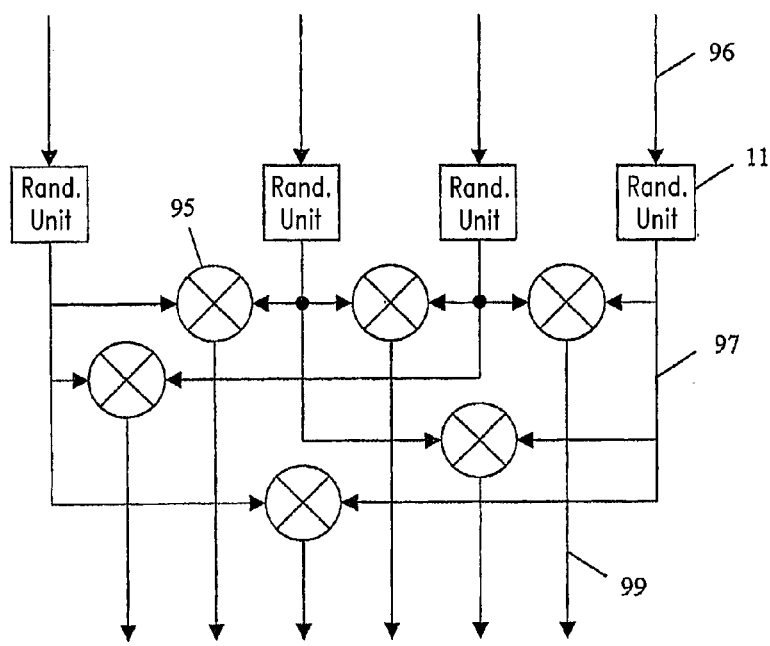
FIG. 6 is a schematic diagram of a portion of a further embodiment of a semiconductor integrated circuit embodying the invention.

In the embodiment shown in FIG. 1, each secondary randomizing unit 15 receives bits directly from the primary randomizing units 11. In other embodiments, the bits received by the secondary randomizing units 15 may be derived from the outputs of the primary randomizing units 11. For example, a portion of a further embodiment of a circuit embodying the invention is shown in FIG. 6. This Figure shows only the primary randomizing units 11 together with a series of primary combination units 95 and data pathways 97. In this embodiment, the randomizing units 11 are look-up tables, and the combination units 95 are XOR combinatorial components. Since the number of combination units 95 in this embodiment is not an integer multiple or divisor of the number of primary randomizing units 11, it is more convenient to show the combination units 95 as separate from, rather than part of, the randomizing units 11.

Each primary randomizing unit 11 received an attribute subset via data pathways 96 and outputs a bitfield retrieved from the look-up table. Each combination unit 95 receives the output of a pair of the primary randomizing units 11 and combines these to generate an output. The primary randomizing units 11 and combination units 95 are connected via a series of data pathways 97 such that each primary randomizing unit 11 is paired, via a combination unit 95, with each of the other three primary randomizing units 11. It can be seen to achieve this, the output from each primary randomizing unit 11 is input into three different combination units 95. The outputs of the combination units 95, which are derived from the outputs of the primary randomizing units 11, are transmitted along data pathways 99 and form the secondary bitfield. Each secondary randomizing unit 15 then receives an input comprising at least one bit derived from the output of at least two of the primary randomizing units 11.

The secondary randomizing units 15 may be paired via a series of combination units in a similar manner, and all or some of the randomizing unit may be paired via a series of combination units to any number of the other randomizing units.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit comprising:
   a mask generator configured to generate a mask for obfuscating input data, the mask generator including:
   an attribute memory configured to store an attribute value associated with the input data as an attribute bitfield;
   a plurality of primary randomizing units, each primary randomizing unit arranged to receive a subset of bits of the attribute bitfield as an input, and to output a bitfield as a function of the input;

a plurality of secondary randomizing units, at least one of the secondary randomizing units arranged to receive an input derived from the output of at least two of the primary randomizing units, and arranged to output a bitfield as a function of the input of the at least one of the secondary randomizing units; and a mask deriving unit arranged to derive the mask from the output of the at least one of the secondary randomizing units;

a mask memory configured to store the mask; and a masking unit configured to receive the input data at a first input, to receive the mask at a second input, and to obfuscate the input data by combining bits of the input data with bits of the mask.

2. A semiconductor integrated circuit according to claim 1 wherein the subset received by each primary randomizing unit comprises a mutually exclusive set of consecutive bits of the attribute bitfield.

3. A semiconductor integrated circuit according to claim 1 wherein the attribute memory is arranged to store a 32 bit bitfield.

4. A semiconductor integrated circuit according to claim 3 wherein there are four primary randomizing units, each receiving a mutually exclusive subset of 8 consecutive bits of the 32 bit attribute bitfield.

5. A semiconductor integrated circuit according to claim 1 wherein at least one randomizing unit is arranged to generate an output as a unique, quasi-random function of the input of the at least one randomizing unit.

6. A semiconductor integrated circuit according to claim 1 wherein the outputs of the secondary randomizing units are combined by concatenation to form the mask.

7. A semiconductor integrated circuit according to claim 1 wherein the input data and the mask have the same number of bits.

8. A semiconductor integrated circuit according to claim 7 wherein the masking unit is arranged to perform a bitwise exclusive-or function between the input data and the mask.

9. A semiconductor integrated circuit according to claim 1 wherein the bits of the input data are permuted either before or after the input data is combined with the data mask.

10. A semiconductor integrated circuit according to claim 1 wherein at least one of the primary or secondary randomizing units comprises a look-up table arranged to use the input of the at least one of the primary or secondary randomizing units as an index to select and retrieve one of a plurality of bitfields stored in the look-up table.

11. A semiconductor integrated circuit according to claim 10 wherein contents of the look-up table comprise a series of random bitfields.

12. A semiconductor integrated circuit according to claim 11 wherein each bitfield in the series is distinct.

13. A semiconductor integrated circuit according to claim 10, wherein the look-up table is arranged to store $2^p$ bitfields, each bitfield being at least p bits in length, where p is the number of bits comprised in the input of the randomizing unit.

14. A semiconductor integrated circuit according to claim 13, wherein each bitfield stored in the look-up table is p bits in length.

15. A semiconductor integrated circuit according to claim 10 wherein the look-up table is a random access memory.

16. A semiconductor integrated circuit according to claim 1 wherein at least one of the primary or secondary randomizing units comprises:

a first look-up table which receives a first bitfield portion of the input of the randomizing unit, and is arranged to use the first portion of the input as an index to select and retrieve one of a plurality of bitfields stored in the first look-up table;

a second look-up table which receives a second bitfield portion of the input of the randomizing unit, and is arranged to use the second portion of the input as an index to select and retrieve one of a plurality of bitfields stored in the second look-up table; and a first combination unit arranged to receive the outputs of the first and second look-up tables, and to combine bits of the two outputs in a manner to generate a first output of the randomizing unit.

17. A semiconductor integrated circuit according to claim 16 wherein the input of the first look-up table comprises lower half order bits of the input of the randomizing unit, and the input of the second look-up table comprises higher half order bits of the input of the randomizing unit.

18. A semiconductor integrated circuit according to claim 17 wherein the first and second look-up tables are each arranged to store $2^{1/2p}$ bitfields, each bitfield being at least p bits in length, where p is the number of bits comprised in the input of the randomizing unit.

19. A semiconductor integrated circuit according to claim 18 wherein the bitfields stored in the first and second look-up tables are each p bits in length.

20. A semiconductor integrated circuit according to claim 16 wherein contents of the first and second look-up table comprise a series of random bitfields.

21. A semiconductor integrated circuit according to claim 16 wherein the first combination unit is arranged to perform a bitwise exclusive-or function between the outputs of the first and second look-up tables.

22. A semiconductor integrated circuit according to claim 21 wherein contents of the first look-up table comprises a first bitfield set, $\{A_n\}$, and the contents of the second look-up table comprises a second bitfield set, $\{B_n\}$, the bitfield sets being chosen such that $A_i \neq A_j$ and $B_i \neq B_j$ for $i \neq j$, and $A_i$ XOR $B_j$ is unique for all combinations of i and j, where i, j=1, 2, ..., n.

23. A semiconductor integrated circuit according to claim 16 wherein the randomizing unit further comprises a second combination unit arranged to receive the output of the first look-up table, and to receive the output of the second look-up table of another randomizing unit, and to combine the bits of the two outputs in a predetermined manner to generate a second output of the randomizing unit.

24. A semiconductor integrated circuit according to claim 23 wherein the second combination unit is arranged to perform a bitwise exclusive-or function between the outputs of the first look-up table of the randomizing unit and the second look-up table of the other randomizing unit.

25. A semiconductor integrated circuit according to claim 23 wherein the outputs of the first and second combination units of the randomizing unit are combined in a predetermined manner to form the output of the randomizing unit.

26. A semiconductor integrated circuit according to claim 25 wherein the outputs of the first and second combination units are combined by concatenation.

27. A semiconductor integrated circuit according to claim 1 wherein at least one of the primary or secondary randomizing units comprises:

a look-up table which receives the input of the randomizing unit, and is arranged to use the input as an index to select and retrieve one of a plurality of bitfields stored in the look-up table;

a combination unit arranged to receive an output of the look-up table, and to receive an output of another randomizing unit, and to combine the bits of the outputs in a predetermined manner to generate an output of the randomizing unit.

28. A semiconductor integrated circuit according to claim 27 wherein the combination unit is arranged to perform a bitwise exclusive-or function between the outputs of the look-up table of the randomizing unit and the output of the other randomizing unit.

29. A semiconductor integrated circuit according to claim 1 wherein contents of the randomizing units are modifiable.

30. A semiconductor integrated circuit according to claim 1 wherein the input of at least one secondary randomizing unit comprises at least one bit from the output of at least two of the primary randomizing units.

31. A semiconductor integrated circuit according to claim 30 wherein the input of all of the secondary randomizing unit comprises at least one bit from the output of all of the primary randomizing units.

32. A semiconductor integrated circuit according to claim 31 wherein there are n secondary randomizing units, and the nth secondary randomizing unit is arranged to receive an input comprising the nth bit of the output from each primary randomizing unit, where n is the number of bits in the output of each primary randomizing unit.

33. A semiconductor integrated circuit according to claim 1 wherein there are eight secondary randomizing units and each secondary randomizing unit is arranged to output a 4 bit bitfield.

34. A semiconductor integrated circuit according to claim 1, further comprising a plurality of primary combination units, each primary combination unit arranged to receive the outputs from two or more primary randomizing units and to combine the outputs to generate an output derived from the outputs of the primary randomizing units.

35. A semiconductor integrated circuit according to claim 34 wherein each primary combination unit is arranged to receive the outputs from two primary randomizing units, and is further arranged to perform a bitwise exclusive-or function between the outputs of the primary randomizing units.

36. A semiconductor integrated circuit according to claim 1, further comprising a plurality of secondary combination units, each secondary combination unit arranged to receive the outputs from two or more secondary randomizing units and to combine the outputs to generate an output derived from the outputs of the secondary randomizing units.

37. A semiconductor integrated circuit according to claim 36 wherein each secondary combination unit is arranged to receive the outputs from two secondary randomizing units, and is further arranged to perform a bitwise exclusive-or function between the outputs of the secondary randomizing units.

38. A semiconductor integrated circuit according to claim 1 wherein the circuit is a monolithic circuit.

39. A semiconductor integrated circuit according to claim 1 wherein the attribute value associated with the input data is a memory address of the input data.

40. A semiconductor integrated circuit according to claim 1 wherein the input data is television broadcast data.

41. A set-top-box comprising:
a set-top box housing; and
a semiconductor integrated circuit comprising:
a mask generator configured to generate a mask for obfuscating input data, the mask generator including:
an attribute memory configured to store an attribute value associated with the input data as an attribute bitfield;
a plurality of primary randomizing units, each primary randomizing unit arranged to receive a subset of bits of the attribute bitfield as an input, and to output a bitfield as a function of the input;
a plurality of secondary randomizing units, at least one of the secondary randomizing units arranged to receive an input derived from the output of at least two of the primary randomizing units, and arranged to output a bitfield as a function of the input of the at least one of the secondary randomizing units; and
a mask deriving unit arranged to derive the mask from the output of the at least one of the secondary randomizing units;
a mask memory configured to store the mask; and
a masking unit configured to receive the input data at a first input, to receive the mask at a second input, and to obfuscate the input data by combining bits of the input data with bits of the mask.

42. A method comprising:
storing an attribute value associated with input data as an attribute bitfield, the attribute bitfield including a plurality of subsets of bits;
randomizing each of the subsets of bits of the attribute bitfield and providing a plurality of randomized subsets of bits using a plurality of randomizing units;
receiving, from at least one of the plurality of randomizing units, bits from at least two of the randomized subsets of bits;
creating the mask by randomizing the bits received from the at least two of the randomized subsets of bits; and
combining bits of the input data with bits of the mask to obfuscate the input data, wherein:
the storing is performing using a memory device;
the randomizing, receiving, creating, and combining are performed using one or more processing devices; and
the randomizing each of the subsets of bits comprises using a look-up table arranged to use an input of the at least one of the plurality of randomizing units as an index to select and retrieve one of a plurality of bitfields stored in the look-up table.

43. The set-top-box according to claim 41 wherein the subset received by each primary randomizing unit comprises a mutually exclusive set of consecutive bits of the attribute bitfield.

44. The set-top-box according to claim 41 wherein the attribute memory is arranged to store a 32 bit bitfield.

45. The set-top-box according to claim 44 wherein there are four primary randomizing units, each receiving a mutually exclusive subset of 8 consecutive bits of the 32 bit attribute bitfield.

46. The set-top-box according to claim 41 wherein at least one of the primary or secondary randomizing units comprises a look-up table arranged to use the input of the at least one of the primary or secondary randomizing units as an index to select and retrieve one of a plurality of bitfields stored in the look-up table.

47. The set-top-box according to claim 41 wherein at least one of the primary or secondary randomizing units comprises:
a first look-up table which receives a first bitfield portion of the input of the randomizing unit, and is arranged to use the first portion of the input as an index to select and retrieve one of a plurality of bitfields stored in the first look-up table;
a second look-up table which receives a second bitfield portion of the input of the randomizing unit, and is arranged to use the second portion of the input as an index to select and retrieve one of a plurality of bitfields stored in the second look-up table; and a first combination unit arranged to receive the outputs of the first and second look-up tables, and to combine bits of the two outputs in a manner to generate a first output of the randomizing unit.

48. The method according to claim 42 wherein each subset in the plurality of subsets of bits comprises a mutually exclusive set of consecutive bits of the attribute bitfield.

49. The method according to claim 42 wherein the attribute bitfield is a 32 bit bitfield.

50. The method according to claim 49 wherein the randomizing each of the subsets of bits comprises randomizing by four primary randomizing units, each receiving a mutually exclusive subset of 8 consecutive bits of the 32 bit attribute bitfield.

51. The method according to claim 42 wherein the look-up table is a first look-up table and the randomizing comprises:

receiving in the first look-up table a first bitfield portion of one of the plurality of subsets of bits;

using the first portion as an index to select and retrieve one of a plurality of bitfields stored in the first look-up table;

receiving in a second look-up table a second bitfield portion of the one of the plurality of subsets of bits;

using the second portion as an index to select and retrieve one of a plurality of bitfields stored in the second look-up table;

receiving outputs of the first and second look-up tables; and combining bits of the outputs of the first and second look-up tables in a manner to generate a first output of a randomizing unit.

52. The method according to claim 42 wherein the plurality of randomizing units includes a plurality of primary randomizing units and a plurality of secondary randomizing units, and further comprising using the input of the at least one of the primary or secondary randomizing units as an index to select and retrieve one of a plurality of bitfields stored in the look-up table.

53. The set-top-box according to claim 41 wherein at least one of the primary or secondary randomizing units comprises a look-up table arranged to use the input of the at least one of the primary or secondary randomizing units as an index to select and retrieve one of a plurality of bitfields stored in the look-up table.

\* \* \* \* \*